Figure 1:
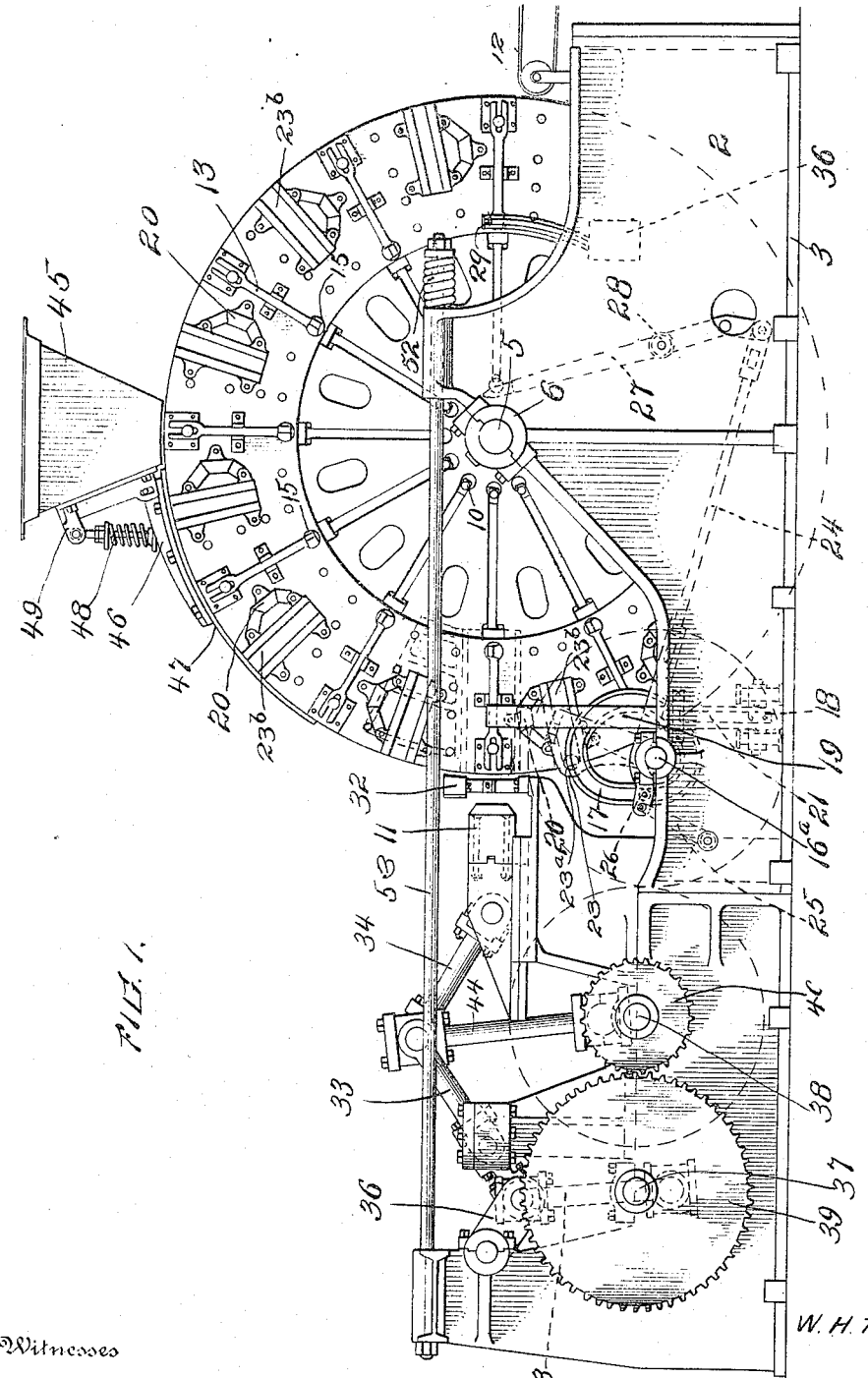

W. H. FULCHER.
CONCRETE PRESS.
APPLICATION FILED JAN. 16, 1914.

1,160,996.

Patented Nov. 16, 1915.
4 SHEETS—SHEET 1.

Witnesses
R. S. Trogner
R. R. Duffie

Inventor
W. H. Fulcher.
By John P. Duffie
Attorney

W. H. FULCHER.
CONCRETE PRESS.
APPLICATION FILED JAN. 16, 1914.
1,160,996.
Patented Nov. 16, 1915.
4 SHEETS—SHEET 2.
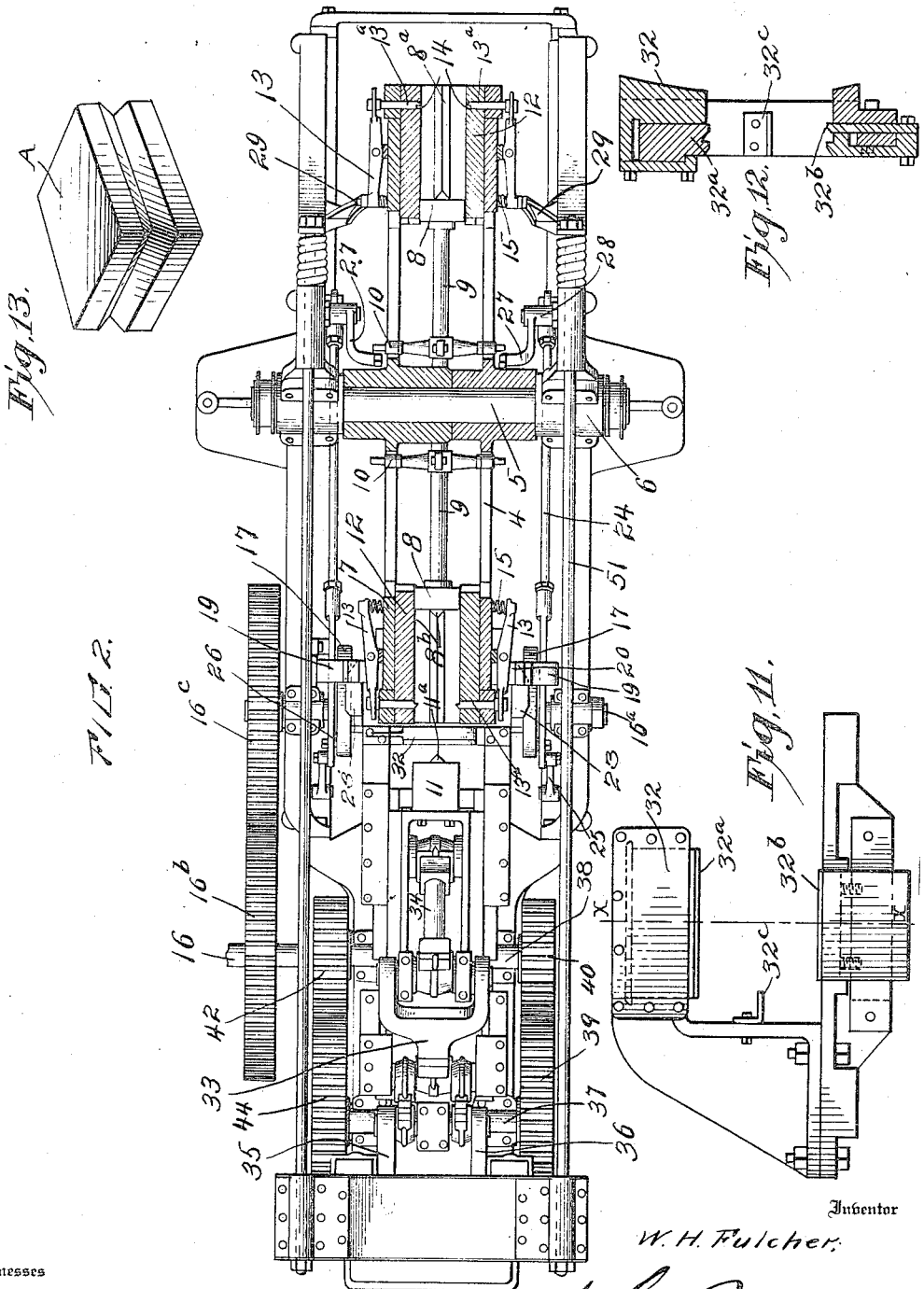

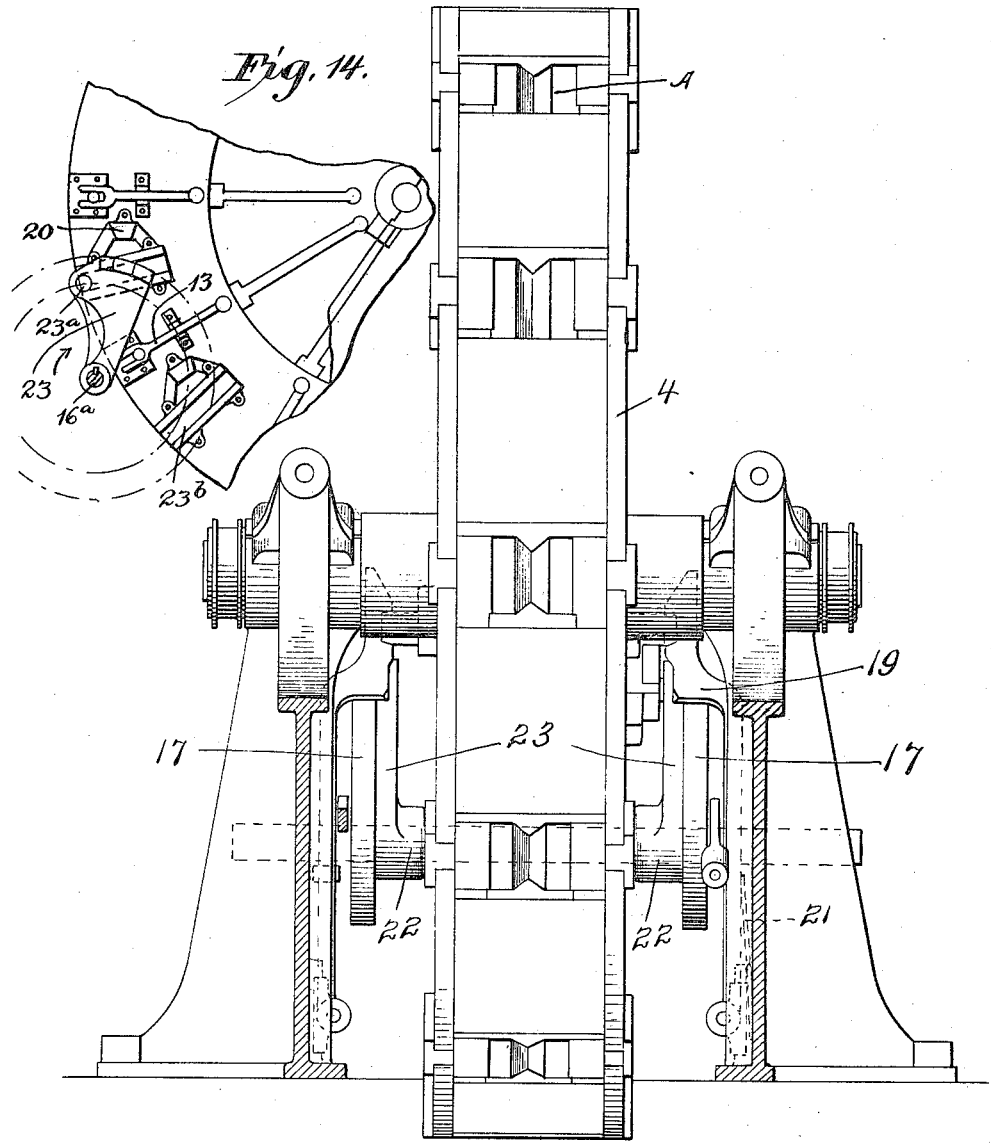

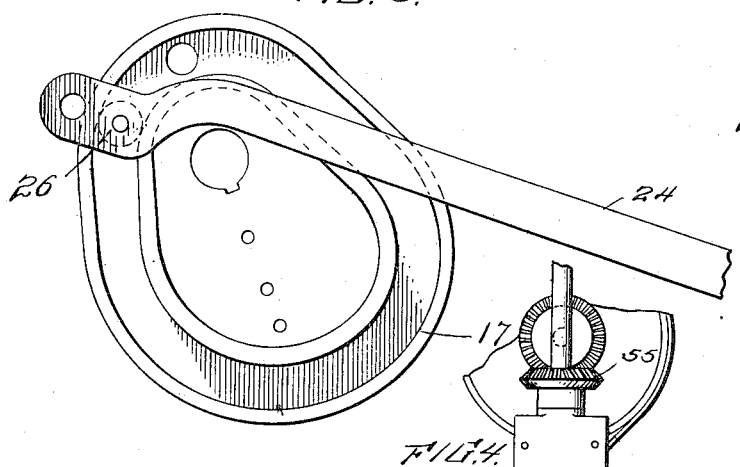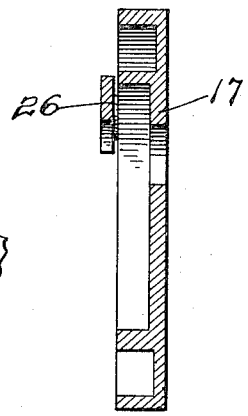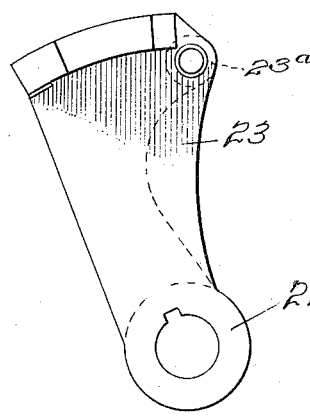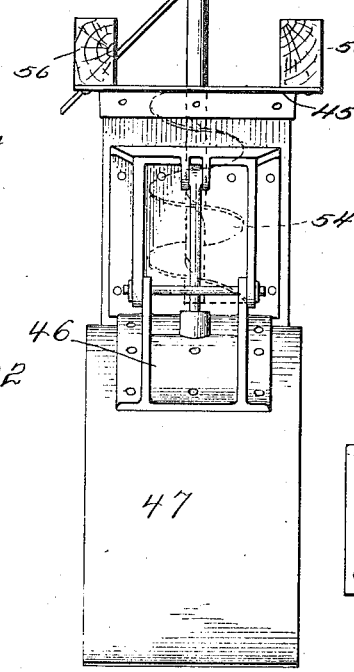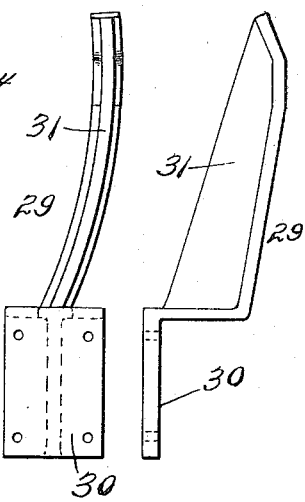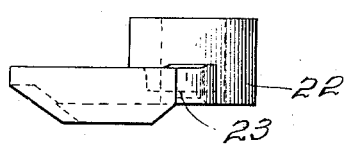

UNITED STATES PATENT OFFICE.

WILLIAM H. FULCHER, OF OAKLAND, CALIFORNIA.

CONCRETE-PRESS.

1,160,996.	Specification of Letters Patent.	Patented Nov. 16, 1915.

Application filed January 16, 1914. Serial No. 812,490.

*To all whom it may concern:*

Be it known that I, WILLIAM H. FULCHER, a citizen of the United States, residing at 2127 Fourth avenue, Oakland, in the county of Alameda and State of California, have invented certain new and useful Improvements in Concrete-Presses, of which the following is a specification.

This invention relates to improvements in presses, more especially for molding concrete or plastic materials into rectangular or brick form for building purposes, as well as other purposes.

The invention has for its object to perform the molding operation with facility and in a simple and effective manner.

A further object is to provide for the feeding of the concrete or plastic material to the machine and the delivery of said material therefrom in molded form and the immediate transference of the molded material from the machine.

A further object is to provide for automatically feeding the concrete or material to the molds.

A still further object is to provide for the automatic actuation of the mold-carrier at the requisite or suitable intervals for the successive filling or feeding of the material to the molds and the discharge of the contents thereof.

A still further object is to provide for automatically compensating for the out-weighted side of the mold-carrier as the same is in movement or rotated.

A still further object is to effect the automatic manipulation of the pallet-holder for suitably disposing the pallets in the molds and at the proper time; also to provide for the automatic release of the pallets, as in effecting the expulsion of the latter from the mold-chambers.

Other objects will be made apparent during the disclosure of the invention, as will appear from the following description and accompanying illustration.

The invention therefore consists of certain instrumentalities and features of construction substantially as hereinafter fully disclosed and defined by the appended claims.

In the accompanying drawings is illustrated the preferred embodiment of my invention, wherein it will be understood that various changes and modifications as to the detailed construction and arrangement of parts may be resorted to, within the scope of the appended claims without departing from the spirit of the invention and in which drawing—

Figure 1 is a side elevation of my improved press or molding machine. Fig. 2 is a plan view, partly in horizontal section, thereof. Fig. 3 is a vertical elevation, partly in vertical section, of the same. Fig. 4 is a detailed elevational view of the feeding hopper and adjunctive parts. Fig. 5 is a detailed side or face view of the controlling cam and the lever actuated thereby in connection with the mold-expulsion plungers. Fig. 6 is a central longitudinal sectional view of said cam, said lever being shown in transverse section. Fig. 7 is a detached side view of the mold-carrier intermittently actuating member or arm. Figs. 8 and 9 represent an edge or face view, and a side view of a mold engaging dog or latch, respectively. Fig. 10 is a plan view of such dog or latch actuating member. Figs. 11 and 12 represent a side view and a sectional view of the pallet-holder, the section being on the line $x-x$ of Fig. 11. Fig. 13 is a perspective view of the molded block or product of my machine. Fig. 14 is a fragmental side view of the mold-carrier, showing more especially the roll-equipped stud of one of its intermittently actuating arms in engagement with a slot or recess $23^b$ of the mold-carrier, the path or circle of movement of said arm being shown in dotted lines.

In carrying out my invention, I provide a suitable base preferably including a metal frame 2 heavily built and bolted into a foundation 3, which may be of any suitable construction. Suitably mounted within the frame is a cylindrical rotary mold-carrier 4, its shaft 5 being suitably journaled in bearings 6 bolted to said frame. Said carrier is equipped at as close intervals as possible, throughout its periphery, with radial mold-chambers 7 opening at their discharging ends out through said periphery. The mold chambers 7 are equipped with plungers 8 whose rods 9 extend toward the center of the carrier 4 and are preferably provided with anti-frictional rolls 10 extending laterally therefrom for ready engagement therewith of the actuating means for said plungers, described later.

At diametrically opposite points in the periphery of the carrier 4 are a compressor-head 11 and an off-bearing endless apron 12, respectively, the former serving for compressing the plastic material in the molds.

Suitably fulcrumed laterally upon the carrier 4 are opposed levers 13 equipped with dogs 13ª projecting through apertures 14 in the lateral portions of the carrier 4 and notched at their mold-chamber receiving ends to enable them to effectively engage the mold-pallets (not shown) the opposite ends of said levers being resiliently held so as to retain the dogs 13ª in engaged position by means of springs 15 interposed between said levers and said carrier.

A shaft 16ª suitably driven from and intergeared with the main driving shaft 16, as at 16ᵇ, 16ᶜ and suitably journaled in position in the frame 2, has suitably fixed thereon cams 17 the purpose of which will presently appear; also suitably fulcrumed at their lower ends, as at 18, in the base to swing laterally with respect to the carrier 4 are upright latches 19 suitably spring-actuated, as at 21, and so as to be engaged by outstanding studs 20, on the mold-carrier for its retention against movement when the molds are being filled at the feeding point and the filled molds are discharged upon the offbearing apron 12, which operations occur simultaneously. Also keyed upon the shaft 16ª are arms 23 which are arranged to be actuated by said shaft said arms having projecting laterally therefrom roll-equipped studs 23ª, while the mold-carrier 4 is provided with lateral castings, at its peripheral edge, said castings forming slots or recesses 23ᵇ with which the roll-equipped studs 23ª of the arms 23 are adapted to engage as the latter are actuated, for imparting an intermittent rotary motion to the mold carrier 4, the arms with their roll-equipped studs describing the circular movement, as indicated by dotted lines in Fig. 14, thus intermittently engaging said recesses or slots. It is also observed that upon the initial engagement of the roll-equipped studs 23ª of the arms 23 with the slots of the mold-carrier, an accelerated movement will be imparted to the latter, for an interval of its movement, the rest of the movement of said mold-carrier being retarded until brought to a state of rest, the roll-equipped studs then leaving the engaged slots and the latches 19 engaging the bosses 20 of the mold-carrier for its retention against further movement until reëngagement is effected between the roll-equipped studs of the arms 23 and the mold-carrier as will be appreciated. This arrangement provides for keeping the mold carrier always under control. The cams 17 are adapted to actuate rods 24 pivoted to arms 25 suitably connected to the frame of the machine, said rods 24 being equipped with rolls 26 traversing said cams as the latter are actuated. The rods 24, each of which may be in sections as shown, are connected to levers 27 suitably fulcrumed, as at 28, to the machine frame, said levers being adapted to actuate the plunger-rods 9 of the plungers 8, as the mold-chambers arrive at the point of discharge and eject the product onto the offbearing apron 12.

Suitably arranged within the frame 2 of the machine, at the discharge end thereof are cam arms 29, having lower flat portions 30 for the ready attachment thereof to the inner sides of the casing, the upper portions of said arms being presented edgewise to and so as to engage each of the dog-controlling members 13 and retract the dogs 13ª out of the path of the movement of the plunger 8 when the carrier 4 is intermittently arrested in its rotation for the discharge of the contents of the mold-chambers.

The carrier 4 which is adapted, as previously stated, to have intermittent rotary movement provides for an interval of movement equal to one-twelfth of the circle of its periphery, thus corresponding to the distances the mold-chambers are spaced apart. At the end of each interval of movement of the mold carrier, the latches 19 and the studs 20 will become interlocked, the same assuming the preliminary position indicated in Fig. 2 and thus provide for retaining the mold carrier against movement during the feeding operation and while the mold-chamber contents are being discharged or until the arms 23 are again brought into engagement with said latches, as will be appreciated.

The mold-chambers 7 of the carrier 4 are suitably provided with pallets (not shown) as is usual in molds, said pallet members being suitably placed in the mold chambers, the same also being suitably lubricated, as well understood, to guard against the adherence of the plastic material thereto.

A pallet-holder 32 of suitable construction, for instance, as shown in Figs. 11 and 12, is suitably bolted in position to the frame 2, intermediate the compressor-head 11 and the rotary mold-carrier 4, as seen in Figs. 1 and 2, and which pallet-holder is equipped with an upper gravity-yieldable member 32ª and a lower resiliently yieldable member 32ᵇ for automatically engaging and retaining the pallet, not shown, as will be readily appreciated; the resultant product or block A of my invention is disclosed by Fig. 13.

A multiple toggle-actuating mechanism is provided for imparting the requisite compressing action to the compressor-head 11 and for securing a compound leverage action, including a plurality of jointed-together links 33, 34 and 35, 36, and a plurality of oppositely intergeared crank-shaft connections 37, 38, the gearing being designated as 39, 40, said shaft-connections having fixed thereto intergeared gearing 41, 42 driven from the main driving shaft 16, said crank-shafts 37, 38 having arm connections 43, 44 with said toggle links or members. The effect of this two-fold toggle action is, since the resultant crank-connections are caused to travel above and below the central or median line of the compressor head, to compound the toggle pressure thus provided and to effect the speedy return movement of the compressor head for clearance, as is clearly apparent.

It is further observed that, in this toggle-mechanism, the greater lengthened connecting rod 44 adjuctive of a crank-shaft is carried to and from the center line of the cross-head forming the conjunction between the plurality of toggle links, and that the shorter connecting rod member 43 is carried above and below the center line, whereby the shortest stroke gives the compound compression action upon the cross-head, and whereby instantaneous release of the parts results after such crossing of the center line, which action is necessary for positive clearance of the periphery of the mold-carrying cylinder of the machine.

A hopper 45 is suitably supported above the mold carrier 4 and which hopper receives the plastic material for delivery into the mold-chambers of said carrier as they are successively brought under said hopper, any suitable means being brought into action for feeding the contents of the hopper into said mold-chambers.

The preferable means for supplying or delivering the concrete or plastic material into the hopper is disclosed in Fig. 4 (the same elsewhere, as for instance in Fig. 1, being omitted) wherein is shown a spiral conveyer or feeder 54, whose shaft is actuated from above by miter-gearing 55 having preferably pulley and belt connection with a suitable motor (not shown) the hopper 45 being bolted to the underside of an overhead beam or platform 56 through which the concrete or plastic material may be suitably dumped into the hopper. The hopper has hinged to it a ribbed base plate 46 conforming to an arcuate plate 47 to which it is suitably bolted, said hopper being adapted to be secured in position independent of the cylinder in any suitable way, as will be appreciated. A resiliently yieldable connection is effected between the hopper 45, and the plate 46 including a spring-encircled rod 48, the rod having direct bracket-connections 49 with the hopper. This arrangement provides to compensate for the over-weighted side of the carrier 4, due naturally to the molds thereof being filled, the plate 47 serving as a brake.

The heavy castings of the frame 2 have applied thereto suitable brace-rods 53 passed through upwardly extending portions of said frame, as indicated in Figs. 1 and 2, said brace-rods being equipped with tensile coiled springs 52 to relieve undue strain upon the rod-holding nuts with which said rods are provided.

This application carries with it certain features initiated by my abandoned application, Serial Number 788,182.

Having thus fully described my invention what I claim and desire to secure by Letters Patent, is:—

1. A machine of the type described including an intermittently rotary mold-carrier, said mold-carrier being equipped with inner end notched dogs, pallets carried by said mold-carrier, said dogs being arranged to project through the lateral walls of said mold-carrier and having their inner notched ends positioned to engage said pallets, resiliently actuated levers arranged upon said mold-carrier and controlling said dogs, arms so positioned as to engage said dogs as said mold-carrier is rotated, and means for actuating said mold-carrier.

2. A device of the type described, including a rotary cylinder carrying molds, and a resiliently actuated brake applied to the periphery of said cylinder to compensate for the weighted side of said mold carrying cylinder.

3. A machine of the type described including a rotatively mounted mold-carrier, a compressor mounted to compress the contents of the mold-chambers of said mold-carrier, and means for actuating said compressor, comprising jointed together pairs of toggle-links, a plurality of intergeared crank-shaft connections, and means for actuating said crank-shaft connections, whereby is secured a two-fold toggle action and to effect the speedy return movement of the compressor for clearance.

In testimony whereof I affix my signature in presence of two witnesses.

WILLIAM H. FULCHER.

Witnesses:
  H. D. WISE,
  D. G. DONAHUE.

Copies of this patent may be obtained for five cents each, by addressing the "Commissioner of Patents, Washington, D. C."